A. PARAF.
Fluxing Composition.
No. 167,016.  Patented Aug. 24, 1875.
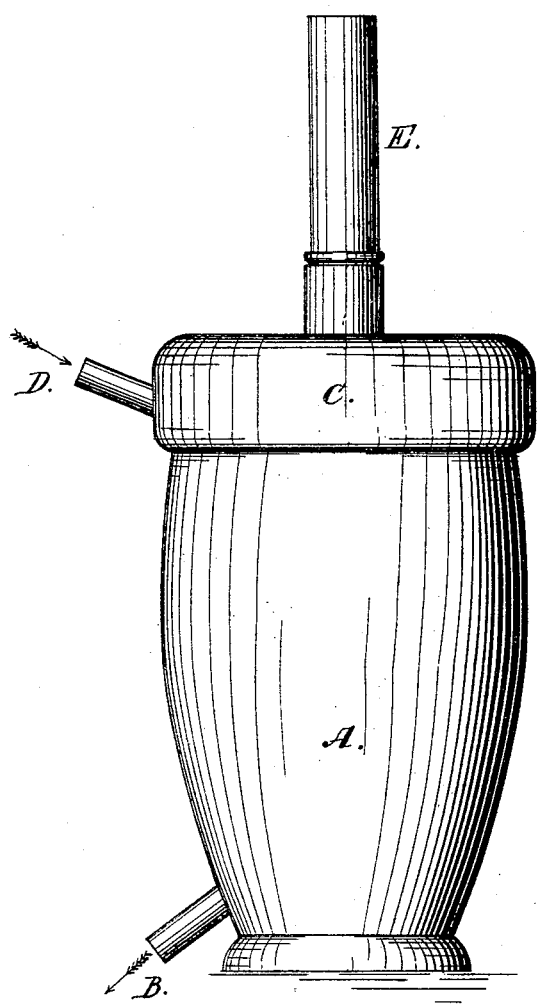
Witnesses:
Alfred Wardow
J. Scott Stewart
Inventor:
Alfred Paraf

UNITED STATES PATENT OFFICE.

ALFRED PARAF, OF SAN FRANCISCO, CALIFORNIA.

IMPROVEMENT IN FLUXING COMPOSITIONS.

Specification forming part of Letters Patent No. 167,016, dated August 24, 1875; application filed July 29, 1875.

*To all whom it may concern:*

Be it known that I, ALFRED PARAF, of San Francisco, State of California, have invented Improvements in Compositions to be Used as Flux in Extracting Metals from Ores.

The following specification is a full and clear description of the manner in which I operate.

In order to extract from any kind of ores, but more especially gold and silver ores, the metals they contain, I operate as follows: For one hundred and thirty-five pounds of finely-powdered ore I add seventy-three pounds of sulphate of soda, and seven pounds of powdered charcoal. This mixture is thoroughly mixed and introduced in fire-clay or black-lead crucibles, as per drawing, attached and made a part of this specification.

A is the crucible; B, the opening through which the melted mixture is extracted. C is a tight cover to be placed over A; D, the opening through which the mixture is introduced. E is a chimney through which the volatile metals, their oxides, or any sulphides, are eliminated. After the above mixture is introduced into the crucibles, the same, with the cover and chimney, are placed in a suitable furnace, similar to the furnaces used in the manufacture of glass and soluble silicates. The fire-clay lined door, which is attached to the opening D, is tightly closed, and the fire-clay plug is introduced into the opening B. Cherry-red heat is then applied for about three hours. When the whole mass is melted, the plug is removed from the opening B. The melted mixture then runs into suitable iron molds. When cold the slag collected at the top is removed, and at the bottom of the iron mold the combination of the metals melted and extracted is found in a metallic shape. The mixture of these metals is then refined in the regular way. Should the ores treated be refractory, the compounds which render them so are, as before mentioned, eliminated through the chimney E.

I have by repeated experiments found that the slag can be again reused for any subsequent smelting of fresh ores.

The sulphate of soda, or potash and charcoal, transforms, in the above-described process, quartz in any ores containing it into silicate of soda or potash.

I mention the above proportions and salts because they have given me good results.

I am aware that ores have heretofore been smelted with mixtures of carbonate of potash or soda, and pulverized charcoal, and with sulphate of soda alone. This I do not claim; but What I do claim is—

A composition to be used as a flux, in the manner described, said composition consisting of a mixture of sulphate of soda or potash, and pulverized charcoal, in the proportions herein specified.

ALFRED PARAF.

Witnesses:
ALFRED A. PARDON,
T. SCOTT STEWART.